May 19, 1964  B. C. KEASLER  3,133,344
INTERNAL KNURLING OF BUSHING BOSSES
Filed June 11, 1962
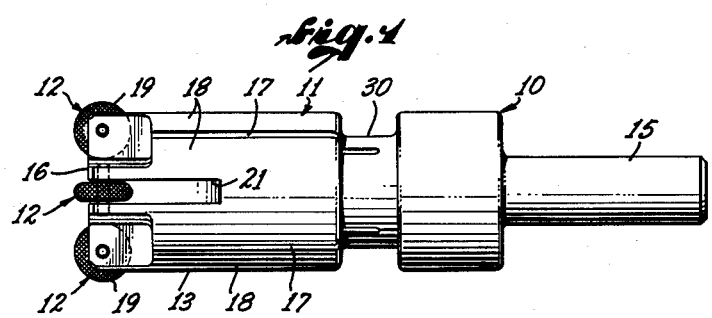
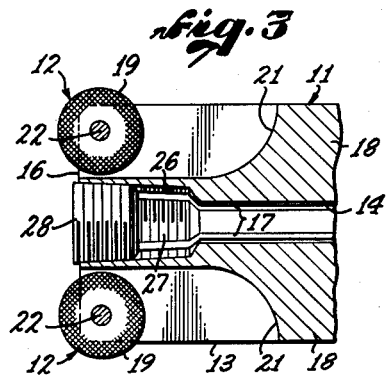
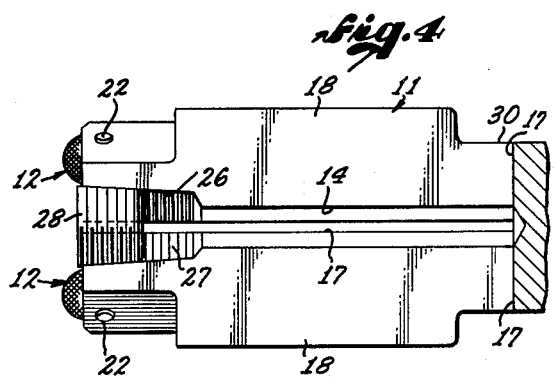
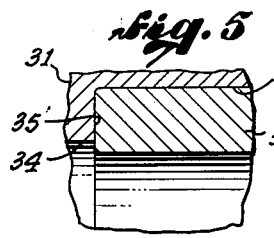
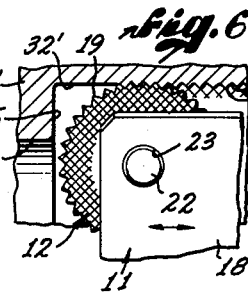
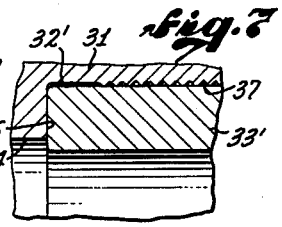
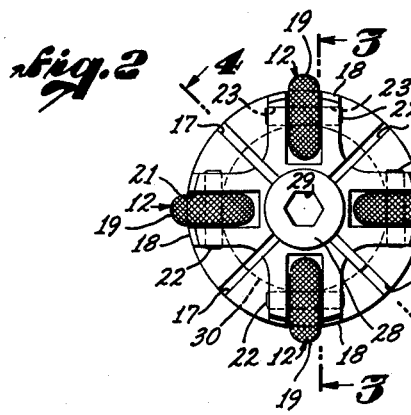
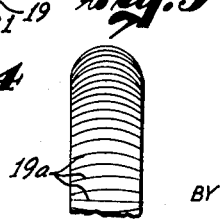
BEN C. KEASLER,
INVENTOR.
BY Lyna H. Lotta
ATTORNEY.

United States Patent Office 3,133,344
Patented May 19, 1964

3,133,344
INTERNAL KNURLING OF BUSHING BOSSES
Ben C. Keasler, 6533 Nancy Road, San Pedro, Calif.
Substituted for abandoned application Ser. No. 19,416, Apr. 1, 1960. This application June 11, 1962, Ser. No. 202,937
3 Claims. (Cl. 29—401)

This application is a substitute for my application S.N. 19,416, filed April 1, 1960, for Internal Knurling of Bushing Bosses, now abandoned.

This invention relates to a means and method of rebearing or rebushing bearing or bushing cases of water pumps, and the like, and more particularly to a means and method whereby worn bearings or bushings may be removed and replaced in a bearing or bushing casing in such a manner that the replacement bearing or bushing is securely and non-leakingly mounted within the bore of the bearing or bushing casing after removal of the original bearing or bushing.

Heretofore replacing of a worn bearing or bushing in water pumps, and the like, has been highly impractical, excessive in cost, and time consuming, inasmuch as removal of the original bearing or bushing usually results in appreciably enlarging the bore whereupon identical replacement bearings or bushings cannot be securely and non-leakingly replaced in the bore. Previously, the bore, after removal of the original bearing or bushing, has required installation of a sleeve liner or shim to compensate for the enlargement of a custom-made bearing or bushing having an external diameter complementary to the enlarged bore had to be provided in order to replace the bearing or bushing to lengthen the life of the water pump and the like.

This invention overcomes these disadvantages by providing a new and improved means and method whereby the bearing or bushing casing, after removal of the original bearing or bushing, is knurled to reduce the diameter of the bore to a dimension such as to provide an interference fit with the outer diameter of the replacement bearing or bushing whereby the replacement bearing or bushing may be press-fitted into the altered bore in a conventional manner to securely mount the bearing or bushing within the bore with a tight fit.

It is therefore an object of this invention to provide a new and improved method of rebearing or rebushing a bearing or bushing casing of water pumps and the like by which the bearing or bushing may be easily and readily removed from the bore for replacement by another bearing or bushing.

Another object of this invention is to provide a new and improved method whereby bearings or bushings of conventional sizes, identical to the original bearing or bushing may be reset within the bore of a bearing or bushing casing.

A further object of this invention is to provide a new and improved method whereby enlargement of the bore due to removal of the original bearing or bushing may be quickly and readily altered to a reduced diameter to receive the replacement bearing or bushing in fluid-tight relationship.

Yet another object of this invention is to provide a new and improved means for altering the oversize bore for reception, in an interference fit, a bearing or bushing of dimensions identical to those of the original bearing or bushing.

Still a further object of this invention is to provide a new and improved method of resetting bearings or bushings which does not require operation by a highly skilled mechanic.

Yet another object of this invention is to provide a new and improved bearing or bushing resetting means which is economical to manufacture, and capable of mass production.

Another object of this invention is to provide a means for resetting bearings or bushings of the character described, which means is adjustable for use with bores of varying diametrical dimension.

A general object of this invention is to provide a new and improved means and method of resetting bearings or bushings which overcome disadvantages of prior means and methods heretofore employed to accomplish generally similar purposes.

These and other objects of this invention will be more apparent from the following detailed description, drawings and appended claims.

In the drawings:

FIG. 1 is a side view, in elevation, of a tool comprising the means for resetting bearings or bushings of this invention;

FIG. 2 is an enlarged end view, as viewed from the left side of the tool illustrated in FIG. 1;

FIG. 3 is a fragmentary, vertical, cross-sectional view, as taken substantially along the line 3—3 of FIG. 2, with parts shown in elevation;

FIG. 4 is a fragmentary, vertical, cross-sectional view, as taken substantially along the line 4—4 of FIG. 2, with parts shown in elevation;

FIGS. 5, 6 and 7 are enlarged fragmentary views illustrating the method of resetting the bearing or bushing in accordance with this invention;

FIG. 8 is an enlarged, fragmentary, cross-sectional view, illustrating the resetting operation in greater detail; and FIG. 9 is a fragmentary detail of a modified form of knurling roller.

Referring in detail to the drawings, and more particularly to FIGS. 1 through 4, inclusive, there is shown, by way of illustration but not of limitation, a tool for resetting bearings or bushings, designed and constructed in accordance with this invention. The tool has a substantially cylindrical body 11 on which a plurality of rotatable knurling rollers 12 are mounted for displacing material of the internal surface of a bore in response to reciprocal movement of the tool.

The tool includes a shank 15, manually or otherwise engageable for reciprocating the body 11, a solid cylindrical waist section 10, and a forward body portion 13, which may or may not be of the same diameter as waist section 10, upon which the cutter means 12 are rotatably mounted.

The forward body portion 13 has a central bore 14 communicating with its forward outer end 16 and a plurality of longitudinal slots 17 radially extending through the body and communicating with the bore 14, thereby defining a plurality (four herein illustrated) of resilient fingers 18 which are resiliently expandable. Fingers 18 are joined integrally to solid waist section 12 by webs 16' which are of reduced thickness for increased flexibility.

The cutters 12 are rotatably mounted in respective fingers 18 adjacent to the forward end 16 thereof, each having a substantial portion of its periphery extending forwardly of the forward end 16 and outwardly of the circumference of the body portion 13. Each finger 18 is partially slotted as at 21 to bifurcate its tip. Each cutter 12 is mounted within one of the slots 21 for rotation around a transverse axle 22 press fitted or otherwise secured, within aligned apertures 23 in the bifurcations, for rotation about an axis transverse to the longitudinal axis of the body 11.

Each of the rollers 12 is circular, has knurling teeth 19 on its outer periphery and is of a hard material, such as hardened steel or the like, so as to bite into and displace material of the inner surface of the bore to be rebearinged or rebushed.

The rollers 12 are preferably equally spaced circumferentially and are radially positioned so that their outer extremities lie on a common circumference, the diameter of the common circumference being preferably adjustable so as to more precisely and accurately recondition the bore for insertion of a replacement bearing or bushing.

For this purpose, the outer end of the bore 14, adjacent to the forward end 16 of the body 11, is counterbored as as 26 and provided with tapered internal threads 27. An externally threaded, tapered plug 28 is threaded therein, a tool-engaging kerf or socket 29 being provided for manipulation thereof. The plug 28 is axially movable within the threaded bore 26 by rotation thereof whereby inward extension of the plug 28 causes spreading of the fingers 18 and thereby increases the circumference described by the outer sides of the rollers 12 whereas, conversely, withdrawal of the plug 28 allows the fingers 18 to retract to decrease the circumference described by the roller means 12. In this manner, the circumference described by the outer extremities of teeth 19 of the rollers 12 may be adjusted to compensate for variance of the bore in which the tool is to be reciprocated to obtain precise displacement of the material thereof. The body 11 is circumferentially relieved as at 30 for facilitating flaring of the figure 18.

*Operation*

Referring to FIG. 5, a portion of a bearing or bushing casing 31 is illustrated having a bore 32 in which a bearing or bushing 33 is press fit, the bore 32 being reduced as as 34 to form a shoulder 35 which is conventional in the installation of a bearing or bushing. Assuming that the bearing or bushing 33 is worn and no longer useful in the bearing or bushing casing 31, as in a water pump, and the like, in which bearings or bushings have a limited span of life, the bearing bushing 33 is spun or otherwise removed in a conventional manner. The bore 32, during the removal operation, is substantially enlarged and usually to a diameter unsuitable for securely retaining a replacement bearing or bushing of identical size.

In accordance with this invention, the tool is adjusted, by means of extending or retracting the plug 28 within the threaded bore 26, to expand or retract the fingers 18 so as to adjust the circumference defined by the outer extremities of the rollers 12 to a dimension appreciably larger than the resulting enlarged bore 32, indicated at 32' in FIG. 6. Reciprocation of the tool and thereby rotation of its rollers 12, causes the rollers 12 to bite into the inner surface of the bore 32' to displace the material of the inner surface 32', the diametrical dimension between opposite ridges 36 being appreciably reduced relative to the diameter of the bore 32'. A replacement bearing or bushing 33', as indicated in FIG. 7, having an outer diameter substantially identical to that of the original bearing or bushing 33 may then be pressed into the bore 32' inasmuch as the diametrical dimension between the ridges 36 is now substantially reduced relative to the outer diameter of the bushing 33', whereby the replacement bearing or bushing 33' is tightly retained within the bore. A substantially non-leaking sealing of the replacement bearing or bushing to the bore can be attained by using knurling rollers having arcuate chisel edge teeth 19a extending transversely across their peripheries in radial planes of the roller axes, as shown in FIG. 9, (as contrasted to conventional pyramidal knurling teeth) the resulting ridges within the bearing or bushing case bore extending circumferentially within the bore as substantially continuous circular ridges, such as to inhibit leakage axially along the bore.

As noted particularly in the enlarged view of FIG. 8, the material of the inner wall of bearing or bushing casing 31 is displaced to form valleys 37 and the ridges 36, the depth of the valleys 37 being substantially equal to the extension $d'$ of the ridges 36, whereby a displacement dimension $d''$ is accomplished when the replacement bearing or bushing 33' is pressed into the now reduced dimension of the bore 31', as indicated at 38, the bearing or bushing 33' being pressed in the direction of the arrowed line 39 of the figure.

By the instant invention, as it will now be more clearly seen, the resultant enlarged bore 32' is decreased in diameter by the displacement of material of the inner surface thereof of the roller means 12 so that the new diametrical dimension is appreciably smaller than the outer diameter of the replacement bearing or bushing 33', of substantially identical outer dimension to that of the original bearing or bushing 33 whereby the replacement bearing or bushing 33' is securely held within the bore.

In the use of knurling tool of FIGS. 1–4, wherein the knurling teeth 19 may be of conventional pyramidal pointed form, the knurling operation is such that a series of pockets or depressions of inverted pyramidal shape are impressed in the bore wall, these depressions being separated by a continuous grid or lattice work of inwardly extruded bore wall against which the cylindrical outer wall of the replacement bearing or bushing will effect a fluid tight seal when pressed into the bore.

While the instant invention has been shown and described herein in what is conceived to be the most practical and preferred embodiment, it is to be recognized that departures may be made therefrom within the scope of the invention which is therefore not to be limited to the details disclosed herein but is to be afforded the full scope of the claims.

I claim:

1. A method of rebearing or rebushing a bearing or bushing casing of water pumps and the like, comprising the steps of: removing a bearing or bushing from the bore of the bearing or bushing casing; reciprocating a knurling tool longitudinally in said bore so as to displace material thereof inwardly to reduce the diameter thereof; and pressing a replacement bearing or bushing having an interference fit with said reduced diameter into said bore.

2. The method defined in claim 1, wherein the knurling produces in said interior surface a series of separated pyramidal depressions separated by a continuing grid of cylindrical bore surface of reduced diameter such as to effect sealing against the external cylindrical wall of the inserted bearing or bushing.

3. The method defined in claim 1, wherein the inwardly displaced material is formed into a series of generally circumferentially continuous internal ridges, defining the reduced diameter of said bore.

References Cited in the file of this patent

UNITED STATES PATENTS

| | | |
|---|---|---|
| 2,179,856 | Leighton | Nov. 14, 1939 |
| 2,618,182 | Teetor | Nov. 18, 1952 |
| 2,670,527 | Roper | Mar. 2, 1954 |